UNITED STATES PATENT OFFICE.

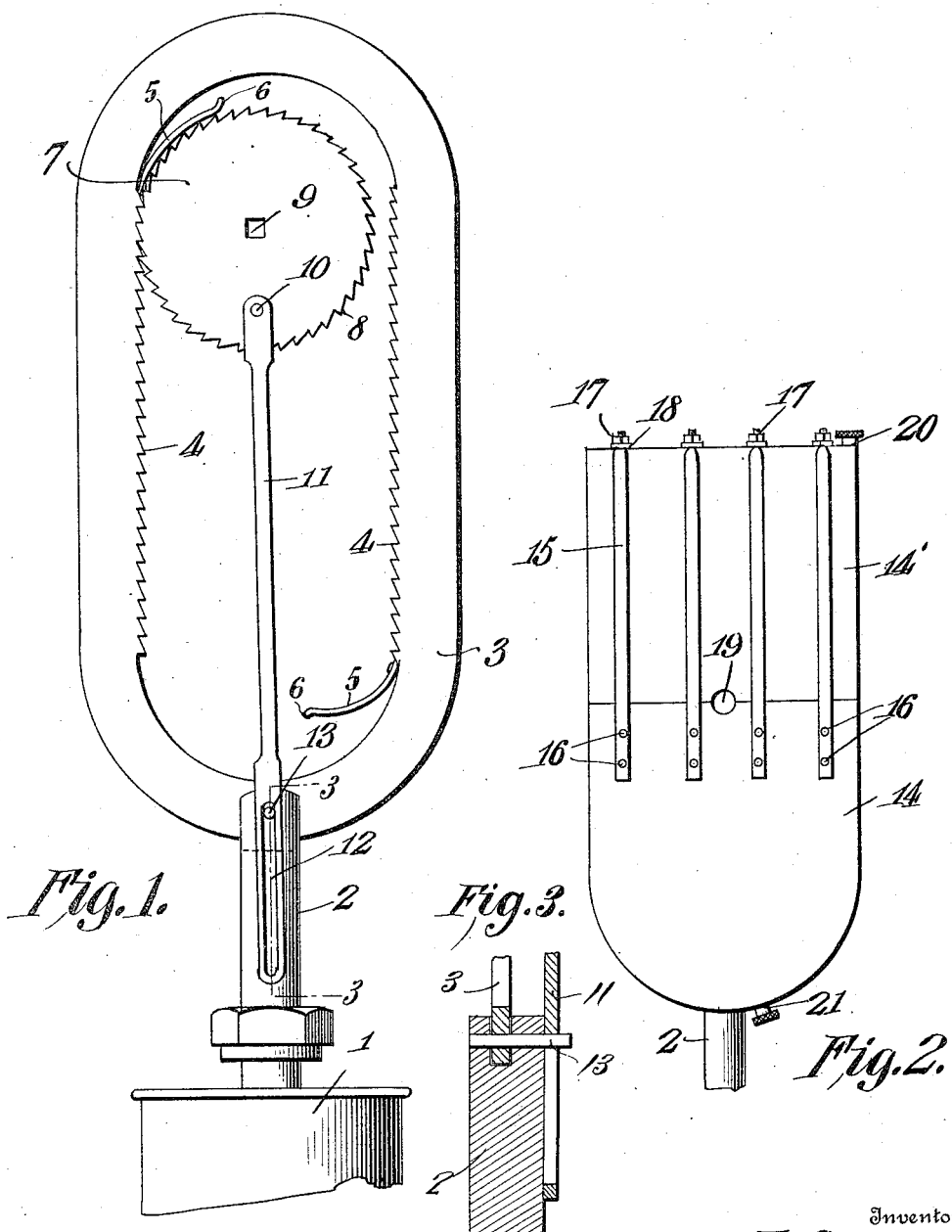

ALFRED F. COYNE, OF MENARD, ILLINOIS, ASSIGNOR OF ONE-HALF TO JOHN A. GEMMILL, OF MENARD, ILLINOIS.

MECHANICAL MOVEMENT.

1,060,429.

Specification of Letters Patent. Patented Apr. 29, 1913.

Application filed January 27, 1909. Serial No. 474,533.

*To all whom it may concern:*

Be it known that I, ALFRED F. COYNE, a citizen of the United States of America, residing at Menard, in the county of Randolph and State of Illinois, have invented new and useful Improvements in Mechanical Movements, of which the following is a specification.

This invention relates to mechanical movements, and one of the principal objects of the same is to provide simple and reliable means for converting a reciprocating movement into a rotary movement.

Another object of the invention is to provide a mechanical movement which will convert a reciprocating movement into a rotary motion without lost motion or dead center.

These and other objects may be attained by means of the construction illustrated in the accompanying drawing, in which,—

Figure 1 is a side elevation of a mechanical movement made in accordance with my invention. Fig. 2 is a side elevation of the casing for inclosing the operative parts of the movement. Fig. 3 is a detail sectional view taken on the line 3—3 of Fig. 1.

Referring to the drawing, the numeral 1 designates the cylinder of an engine or motor, and 2 is the reciprocating member extending into the cylinder and provided with a piston head. Connected to the reciprocating member 2 is an elliptical rack 3 preferably made of a single piece of metal and provided with a row of teeth 4 upon each side of the inner wall of said rack. These teeth, as shown, project in opposite directions; that is to say, the inclined portion and the shoulder of said teeth are oppositely disposed upon the opposite sides of said rack. At the terminal ends of the teeth 4 flat leaf springs 5 are secured, said springs each having an outwardly curved end 6. The wheel 7 to be rotated by the rack is provided with ratchet teeth 8 upon its periphery and is mounted upon the squared end of a shaft which fits within the squared opening 9.

Pivoted to the wheel 7 at 10 is a connecting rod 11 provided with a slotted end 12 which engages a pin 13 on the reciprocating member, said rod 11 serving to steady the wheel 7 at the end of each reciprocation. The pin 13 also pivotally connects the frame 3 to the reciprocating member 2 so that said frame can have the necessary swinging motion to bring the teeth 4 on the respective sides of the frame into successive engagement with the teeth 8 of the wheel 7.

A casing may be fitted over the movement, said casing comprising the rounded lower portion 14 and the upper section 14'. A series of metal straps 15 are secured to the section 14 of the casing by means of rivets 16, and at the upper end of the strap 15 nuts 17 are fitted to the threaded ends thereof. Straps 18 extend across the top of the casing for holding the two sections in place. A hole 19 is formed in the sides of the casing for the shaft of the wheel 7, and lubricant may be inserted in a hole in the casing covered by the cap 20, and an outlet opening in the bottom of the casing is provided with a cap 21 to permit the casing to be cleaned.

The operation of my invention may be briefly described as follows: The reciprocation of the member 2 and the rack 3 transmits rotary motion to the wheel 7 by means of the teeth 4 upon one side of the rack engaging the teeth 8 upon the wheel 7. When the member 3 reaches its limit of movement in one direction it will be shifted so that the teeth at the opposite side thereof will mesh with the teeth of the wheel 7 to rotate the same on reverse movement of the said member.

From the foregoing it will be obvious that my mechanical movement is of simple construction, and will transmit rotation to a wheel and shaft continuously without dead center and without lost motion.

I claim:—

A mechanical movement consisting of a reciprocating member, an elliptical frame pivoted at one end to said reciprocating member and provided with opposing sides having oppositely-disposed teeth, flat springs secured near the opposite ends of said frame and against the opposite sides thereof and having inwardly-directed free ends, a toothed wheel journaled within the frame and adapted to engage the free ends of the springs, and a member pivoted at one end to said wheel and having a slot in its opposite end and connected thereby to said reciprocating member, said springs being adapted to swing the frame to bring the opposite sides thereof into alternate engagement with the toothed wheel.

In testimony whereof I affix my signature in presence of two witnesses.

ALFRED F. COYNE.

Witnesses:
J. A. GORSUCH,
J. A. GEMMILL.

Copies of this patent may be obtained for five cents each, by addressing the "Commissioner of Patents, Washington, D. C."